(12) United States Patent
Vu

(10) Patent No.: US 11,562,194 B2
(45) Date of Patent: *Jan. 24, 2023

(54) METHODS FOR PLACING AN EMV CHIP ONTO A METAL CARD

(71) Applicant: Jonny B. Vu, San Jose, CA (US)

(72) Inventor: Jonny B. Vu, San Jose, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/233,338

(22) Filed: Apr. 16, 2021

(65) Prior Publication Data

US 2021/0232885 A1 Jul. 29, 2021

Related U.S. Application Data

(60) Division of application No. 15/883,858, filed on Jan. 30, 2018, now Pat. No. 10,984,304, which is a continuation-in-part of application No. 15/422,784, filed on Feb. 2, 2017, now Pat. No. 10,336,126.

(51) Int. Cl.
G06K 19/077 (2006.01)
G06Q 20/34 (2012.01)

(52) U.S. Cl.
CPC ....... G06K 19/0772 (2013.01); G06Q 20/341 (2013.01)

(58) Field of Classification Search
CPC .... B42D 25/47; B42D 25/305; B42D 25/373; B29C 35/02; B29C 53/04; B29C 53/84; G06K 19/02; G06K 19/044; G06K 19/07743; G06K 19/07745; G06K 19/07747; Y10T 156/1153

See application file for complete search history.

(56) References Cited

U.S. PATENT DOCUMENTS

| | | |
|---|---|---|
| 3,855,033 A | 12/1974 | Staats |
| 3,896,726 A | 7/1975 | Staats |
| 4,222,516 A | 9/1980 | Badet et al. |
| 4,253,086 A | 2/1981 | Szwarcbier |
| D276,820 S | 12/1984 | Lill |
| 4,582,985 A | 4/1986 | Loefberg |
| 4,705,299 A | 11/1987 | Hedgcoth et al. |
| 4,733,061 A | 3/1988 | Hegi |

(Continued)

OTHER PUBLICATIONS

U.S. Appl. No. 29/843,198, filed Jun. 18, 2022, Jonny B. Vu, Entire Document.

(Continued)

*Primary Examiner* — Seung H Lee
(74) *Attorney, Agent, or Firm* — Thomas W. Galvani, P.C.; Thomas W. Galvani (57) ABSTRACT

A method for removing an EMV chip from a plastic credit card or debit card and placing the removed EMV chip onto a metal card, includes heating the plastic credit or debit card containing the EMV chip to loosen the EMV chip, the EMV chip being substantially square and planar, the EMV chip having an upward top face, a downward bottom face, and four sides; removing the loosened EMV chip from the plastic credit or debit card; bending the four sides of the EMV chip towards the downward bottom face of the EMV chip; applying an adhesive coating to the bottom face and the bended four sides of the EMV chip; and placing the adhesive coated bottom face and bended four sides of the EMV chip into a holding cavity of the metal card.

18 Claims, 6 Drawing Sheets

(56) References Cited

U.S. PATENT DOCUMENTS

| | | |
|---|---|---|
| 4,910,393 A | 3/1990 | Gercekci et al. |
| D310,386 S | 9/1990 | Michels et al. |
| 4,983,036 A | 1/1991 | Froelich |
| 4,999,617 A | 3/1991 | Uemura et al. |
| 5,004,899 A | 4/1991 | Ueda |
| 5,180,901 A | 1/1993 | Hiramatsu |
| 5,280,527 A | 1/1994 | Gullman et al. |
| 5,410,136 A | 4/1995 | Mcintire et al. |
| D359,305 S | 6/1995 | Finkelstein |
| 5,581,065 A | 12/1996 | Nishikawa et al. |
| 5,623,552 A | 4/1997 | Lane |
| 5,864,296 A | 1/1999 | Upton |
| 5,865,470 A | 2/1999 | Thompson |
| 5,903,225 A | 5/1999 | Schmitt et al. |
| 5,920,640 A | 7/1999 | Salatino et al. |
| 5,952,641 A | 9/1999 | Korshun |
| 5,960,100 A | 9/1999 | Hargrove |
| 5,965,867 A | 10/1999 | Haghiri-Tehrani |
| 5,971,282 A | 10/1999 | Rollender et al. |
| 5,975,584 A | 11/1999 | Vogt |
| 6,011,858 A | 1/2000 | Stock et al. |
| 6,012,636 A | 1/2000 | Smith |
| D427,577 S | 7/2000 | Haas et al. |
| D434,041 S | 11/2000 | Burke |
| 6,179,210 B1 | 1/2001 | Haas et al. |
| D437,882 S | 2/2001 | Creighton |
| 6,182,892 B1 | 2/2001 | Angelo et al. |
| 6,213,403 B1 | 4/2001 | Bates |
| 6,216,955 B1 | 4/2001 | Le Roux et al. |
| 6,325,285 B1 | 12/2001 | Baratelli |
| 6,360,953 B1 | 3/2002 | Lin et al. |
| 6,439,464 B1 | 8/2002 | Fruhauf et al. |
| 6,588,660 B1 | 7/2003 | Buescher et al. |
| 6,623,039 B2 | 9/2003 | Thompson et al. |
| 6,628,814 B1 | 9/2003 | Shapiro |
| D481,068 S | 10/2003 | Blossom et al. |
| 6,659,355 B1 | 12/2003 | Fischer et al. |
| 6,693,544 B1 | 2/2004 | Hebbecker |
| 6,775,398 B1 | 8/2004 | Schaeck et al. |
| 6,798,334 B1 | 9/2004 | Meister et al. |
| 6,811,082 B2 | 11/2004 | Wong |
| D501,208 S | 1/2005 | Ozolins et al. |
| 6,883,715 B1 | 4/2005 | Fruhauf et al. |
| H2120 H | 7/2005 | Cudlitz |
| D508,245 S | 8/2005 | Ozolins et al. |
| 7,155,416 B2 | 12/2006 | Shatford |
| D535,992 S | 1/2007 | Ozolins et al. |
| 7,337,979 B2 | 3/2008 | Takao |
| 7,360,688 B1 | 4/2008 | Harris |
| 7,543,337 B2 | 6/2009 | D'agnolo et al. |
| 7,757,942 B1 | 7/2010 | Ford |
| 7,770,800 B2 | 8/2010 | Martinez et al. |
| 7,778,935 B2 | 8/2010 | Colella |
| 7,837,122 B2 | 11/2010 | Martinent et al. |
| 7,994,898 B2 | 8/2011 | Ozolins |
| 8,061,618 B2 | 11/2011 | Mosteller |
| 8,074,878 B1 | 12/2011 | Daniel |
| D672,807 S | 12/2012 | Ahrabian |
| 8,434,675 B2 | 5/2013 | Faith |
| 8,485,447 B1 | 7/2013 | Pyhrr et al. |
| D687,886 S | 8/2013 | Ahrabian |
| D693,874 S | 11/2013 | Daniel |
| D701,900 S | 4/2014 | Daniel |
| 8,925,816 B2 * | 1/2015 | Rodriguez ....... G06K 19/07743 235/487 |
| 9,159,014 B2 | 10/2015 | Narendra et al. |
| 9,208,424 B2 | 12/2015 | Narendra et al. |
| 9,251,458 B2 | 2/2016 | Finn et al. |
| 9,262,649 B2 | 2/2016 | Bertin et al. |
| 9,342,774 B1 | 5/2016 | Lin |
| 9,378,514 B2 | 6/2016 | Tabor et al. |
| 9,466,060 B1 | 10/2016 | Daniel |
| 9,483,723 B2 | 11/2016 | Narendra et al. |
| D774,135 S | 12/2016 | Daniel |
| D776,664 S | 1/2017 | Hendrick |
| D786,355 S | 5/2017 | Hendrick |
| D788,847 S | 6/2017 | Hendrick |
| D797,188 S | 9/2017 | Hendrick |
| D798,385 S | 9/2017 | Yoo et al. |
| 9,773,153 B1 | 9/2017 | Slottner |
| 9,940,571 B1 | 4/2018 | Herrington |
| D824,456 S | 7/2018 | Ishii et al. |
| 10,049,362 B2 | 8/2018 | Mushing et al. |
| 10,223,555 B2 | 3/2019 | Gardiner et al. |
| D851,170 S | 6/2019 | Blum |
| D853,485 S | 7/2019 | Albert et al. |
| 10,336,126 B2 * | 7/2019 | Vu ................ G06K 19/07745 |
| D855,617 S | 8/2019 | Williams |
| D877,242 S | 3/2020 | Arneja et al. |
| D877,739 S | 3/2020 | Maus et al. |
| D895,005 S | 9/2020 | Carroll, II et al. |
| 10,885,419 B2 | 1/2021 | Lowe et al. |
| 10,949,727 B2 | 3/2021 | Vu |
| 10,984,304 B2 | 4/2021 | Vu |
| 11,301,837 B2 * | 4/2022 | Kamaal ................ G07F 7/0833 |
| D956,760 S | 7/2022 | Vu |
| 2001/0000535 A1 | 4/2001 | Lapsley et al. |
| 2001/0008004 A1 | 7/2001 | Jarosz |
| 2002/0021001 A1 | 2/2002 | Stratford et al. |
| 2002/0035542 A1 | 3/2002 | Tumey et al. |
| 2002/0043566 A1 | 4/2002 | Goodman et al. |
| 2002/0060243 A1 | 5/2002 | Janiak et al. |
| 2002/0087869 A1 | 7/2002 | Kim |
| 2002/0095587 A1 | 7/2002 | Doyle et al. |
| 2002/0105232 A1 | 8/2002 | Parrault |
| 2002/0158747 A1 | 10/2002 | Mcgregor et al. |
| 2003/0046555 A1 | 3/2003 | Bradley et al. |
| 2003/0085286 A1 | 5/2003 | Kelley et al. |
| 2003/0086591 A1 | 5/2003 | Simon |
| 2003/0111527 A1 | 6/2003 | Blossom |
| 2003/0209362 A1 | 11/2003 | Kasuga et al. |
| 2003/0226041 A1 | 12/2003 | Palmer et al. |
| 2004/0026915 A1 | 2/2004 | Thompson et al. |
| 2004/0124246 A1 | 7/2004 | Allen et al. |
| 2004/0129787 A1 | 7/2004 | Saito et al. |
| 2004/0133787 A1 | 7/2004 | Doughty et al. |
| 2004/0135241 A1 | 7/2004 | Conner et al. |
| 2004/0172541 A1 | 9/2004 | Ando et al. |
| 2004/0179718 A1 | 9/2004 | Chou et al. |
| 2004/0188519 A1 | 9/2004 | Cassone |
| 2004/0234111 A1 | 11/2004 | Mueller |
| 2004/0242270 A1 | 12/2004 | Bhatt et al. |
| 2005/0029343 A1 | 2/2005 | Neymann |
| 2005/0035200 A1 | 2/2005 | Hendrick |
| 2005/0076182 A1 | 4/2005 | Minne |
| 2005/0077348 A1 | 4/2005 | Hendrick |
| 2005/0139685 A1 | 6/2005 | Kozlay |
| 2005/0178827 A1 | 8/2005 | Shatford |
| 2005/0199708 A1 | 9/2005 | Friedman |
| 2005/0207624 A1 | 9/2005 | Ehlers et al. |
| 2005/0212657 A1 | 9/2005 | Simon |
| 2005/0232471 A1 | 10/2005 | Baer |
| 2005/0269402 A1 | 12/2005 | Spitzer et al. |
| 2006/0000899 A1 | 1/2006 | Bonalle et al. |
| 2006/0095369 A1 | 5/2006 | Hofi |
| 2006/0097059 A1 | 5/2006 | Miyazaki |
| 2006/0113381 A1 | 6/2006 | Hochstein et al. |
| 2006/0124350 A1 | 6/2006 | Droz |
| 2006/0161789 A1 | 7/2006 | Doughty et al. |
| 2006/0213973 A1 | 9/2006 | Chan et al. |
| 2006/0213982 A1 | 9/2006 | Cannon et al. |
| 2006/0278723 A1 | 12/2006 | Dan et al. |
| 2007/0063816 A1 | 3/2007 | Murakami et al. |
| 2007/0073619 A1 | 3/2007 | Smith |
| 2007/0220272 A1 | 9/2007 | Campisi et al. |
| 2007/0220273 A1 | 9/2007 | Campisi |
| 2007/0223179 A1 | 9/2007 | Cheng et al. |
| 2007/0228154 A1 | 10/2007 | Tran |
| 2008/0005425 A1 | 1/2008 | Saito |
| 2008/0029608 A1 | 2/2008 | Kellum et al. |
| 2008/0067247 A1 | 3/2008 | Mcgregor et al. |
| 2008/0120509 A1 | 5/2008 | Simon |
| 2008/0126212 A1 | 5/2008 | Cox |
| 2008/0148059 A1 | 6/2008 | Shapiro |

(56) References Cited

U.S. PATENT DOCUMENTS

| | | |
|---|---|---|
| 2008/0164325 A1 | 7/2008 | Borracci |
| 2008/0223925 A1 | 9/2008 | Saito et al. |
| 2008/0223937 A1 | 9/2008 | Preta et al. |
| 2008/0319915 A1 | 12/2008 | Russell et al. |
| 2009/0008459 A1 | 1/2009 | Mainguet |
| 2009/0040695 A1 | 2/2009 | Fidalgo et al. |
| 2009/0084858 A1 | 4/2009 | Borracci |
| 2009/0145972 A1 | 6/2009 | Evans |
| 2009/0150994 A1 | 6/2009 | Evans |
| 2009/0153297 A1 | 6/2009 | Gardner |
| 2009/0172279 A1 | 7/2009 | Yuan et al. |
| 2009/0199004 A1 | 8/2009 | Krawczewicz et al. |
| 2009/0327529 A1 | 12/2009 | Mardiks |
| 2010/0038436 A1 | 2/2010 | Gaillard |
| 2010/0118131 A1 | 5/2010 | Lee et al. |
| 2010/0142161 A1 | 6/2010 | Garnier |
| 2010/0177486 A1 | 7/2010 | Droz |
| 2010/0277278 A1 | 11/2010 | Courouble et al. |
| 2010/0320274 A1 | 12/2010 | Nielsen et al. |
| 2011/0019367 A1 | 1/2011 | Hatch |
| 2011/0073660 A1 | 3/2011 | Lawyer |
| 2011/0140841 A1 | 6/2011 | Bona et al. |
| 2011/0154662 A1 | 6/2011 | Droz |
| 2011/0175702 A1 | 7/2011 | Desnoyers |
| 2011/0182040 A1 | 7/2011 | Ellul et al. |
| 2011/0187523 A1 | 8/2011 | Edelstein et al. |
| 2011/0256832 A1 | 10/2011 | Park |
| 2012/0019363 A1 | 1/2012 | Fein |
| 2012/0049309 A1 | 3/2012 | Kiyomoto et al. |
| 2012/0062241 A1 | 3/2012 | Rossi et al. |
| 2012/0168500 A1 | 7/2012 | Li |
| 2012/0199653 A1 | 8/2012 | Wenzel |
| 2012/0218079 A1 | 8/2012 | Kim |
| 2012/0288169 A1 | 11/2012 | Kim |
| 2012/0298757 A1 | 11/2012 | Kim |
| 2012/0318863 A1 | 12/2012 | Kim |
| 2013/0026238 A1 | 1/2013 | Benato |
| 2013/0036017 A1 | 2/2013 | Galloway |
| 2013/0036463 A1 | 2/2013 | Shashidhar |
| 2013/0056539 A1 | 3/2013 | Iwaloye |
| 2013/0081127 A1 | 3/2013 | Chen |
| 2013/0218601 A1 | 8/2013 | Webb |
| 2013/0221100 A1 | 8/2013 | Holman et al. |
| 2014/0052632 A1 | 2/2014 | Galloway |
| 2014/0097253 A1 | 4/2014 | Benato |
| 2014/0124583 A1 | 5/2014 | Reed |
| 2014/0232525 A1 | 8/2014 | Mohmedi et al. |
| 2015/0049925 A1 | 2/2015 | Lowe et al. |
| 2015/0136858 A1 | 5/2015 | Finn et al. |
| 2015/0186663 A1 | 7/2015 | Schmidt et al. |
| 2015/0206148 A1 | 7/2015 | Cherry et al. |
| 2015/0220918 A1 | 8/2015 | Davis et al. |
| 2015/0294131 A1 | 10/2015 | Neskovic et al. |
| 2015/0295920 A1 | 10/2015 | Van Kerrebroeck et al. |
| 2016/0026842 A1 | 1/2016 | Withers et al. |
| 2016/0057627 A1 | 2/2016 | Burgbacher |
| 2016/0155039 A1 | 6/2016 | Neymann et al. |
| 2016/0203346 A1 | 7/2016 | Gardiner et al. |
| 2016/0246954 A1 | 8/2016 | Kim et al. |
| 2016/0267466 A1 | 9/2016 | Kumnick et al. |
| 2016/0307081 A1 | 10/2016 | Wurmfeld et al. |
| 2016/0307089 A1 | 10/2016 | Wurmfeld et al. |
| 2016/0379036 A1 | 12/2016 | Long |
| 2017/0011287 A1 | 1/2017 | Kapp et al. |
| 2017/0017871 A1 | 1/2017 | Finn et al. |
| 2017/0046714 A1 | 2/2017 | Van De et al. |
| 2017/0061273 A1 | 3/2017 | Coppola et al. |
| 2017/0116505 A1 | 4/2017 | Suwald |
| 2017/0132504 A1 | 5/2017 | Kurian |
| 2017/0213097 A1 | 7/2017 | Vogel et al. |
| 2017/0228631 A1 | 8/2017 | Larsen et al. |
| 2017/0244437 A1 | 8/2017 | Alieri |
| 2017/0289127 A1 | 10/2017 | Hendrick |
| 2017/0293792 A1 | 10/2017 | Lavin |
| 2017/0300799 A1 | 10/2017 | Breed et al. |
| 2017/0345740 A1 | 11/2017 | Spoettl et al. |
| 2018/0018839 A1 | 1/2018 | Levitov et al. |
| 2018/0039874 A1 | 2/2018 | Fischer et al. |
| 2018/0082165 A1 | 3/2018 | Mosteller et al. |
| 2018/0092216 A1 | 3/2018 | Cyman, Jr. et al. |
| 2018/0108018 A1 | 4/2018 | Lee et al. |
| 2018/0129831 A1 | 5/2018 | Yokoi et al. |
| 2018/0130049 A1 | 5/2018 | Busch et al. |
| 2018/0174013 A1 | 6/2018 | Lee |
| 2018/0174018 A1 | 6/2018 | Lundberg et al. |
| 2018/0181958 A1 | 6/2018 | Locke et al. |
| 2018/0197056 A1 | 7/2018 | Bousquet et al. |
| 2018/0253634 A1 | 9/2018 | Fortassin et al. |
| 2018/0268274 A1 | 9/2018 | Lowe et al. |
| 2018/0276357 A1 | 9/2018 | Tsuboi et al. |
| 2018/0276358 A1 | 9/2018 | Sawamura et al. |
| 2018/0276518 A1 | 9/2018 | Benkley, III et al. |
| 2018/0330138 A1 | 11/2018 | Suwald |
| 2018/0330221 A1 | 11/2018 | Fischer et al. |
| 2018/0373857 A1 | 12/2018 | Larsen et al. |
| 2019/0019072 A1 | 1/2019 | Bertiaux et al. |
| 2019/0019195 A1 | 1/2019 | Dunjic et al. |
| 2019/0026745 A1 | 1/2019 | Fromager et al. |
| 2019/0034378 A1 | 1/2019 | Suwald et al. |
| 2019/0050623 A1 | 2/2019 | Lavin et al. |
| 2019/0065716 A1 | 2/2019 | Lavin |
| 2019/0065918 A1 | 2/2019 | Humborstad |
| 2019/0065919 A1 | 2/2019 | Maheshwari et al. |
| 2019/0065922 A1 | 2/2019 | Nielsen et al. |
| 2019/0066094 A1 | 2/2019 | Bae et al. |
| 2019/0073578 A1 | 3/2019 | Lowe et al. |
| 2021/0232885 A1 | 7/2021 | Vu |

OTHER PUBLICATIONS

Beta EMV Chip Swap™ Procedure. Posted Aug. 8, 2016. https://metal-creditcard.com/2016/08/beta-emv-chip-swap-procedure/ (Year: 2016).

\* cited by examiner

METHODS FOR PLACING AN EMV CHIP ONTO A METAL CARD

CROSS-REFERENCE TO RELATED APPLICATION

This application is a divisional of U.S. patent application Ser. No. 15/883,858, filed on Jan. 30, 2018, which is a continuation-in-part of U.S. patent application Ser. No. 15/422,784, filed on Feb. 2, 2017, issued as U.S. Pat. No. 10,336,126 on Jul. 2, 2019; each of which is incorporated herein by reference in its entirety.

FIELD OF THE INVENTION

The invention relates to methods for placing an EMV chip onto a metal card and more particularly, to methods for removing an EMV chip from a plastic credit card or debit card and placing the removed EMV chip onto a stainless steel metal card or debit card.

BACKGROUND OF THE INVENTION

Credit cards and debit cards were originally developed using a magnetic stripe or mechanical imprint to read and record account data, with the customer's signature being used for verification. Under this system, the customer handed their card to the clerk at the point of sale, who either swiped the card through a magnetic reader or made an imprint from the raised text on the card. With the magnetic reader, the system verified the account information and printed a slip for the customer to sign. For the imprinted text, the transaction details were filled in and the customer signed the imprinted slip. In both cases, the clerk verified that the customer's signature matched the signature on the back of the card. While being convenient and useful, this system has a number of security flaws, including the ability to copy the card's information, or by reading and writing the magnetic stripe of the card during a transaction, making these cards easy to duplicate and use without the owner's knowledge.

To address this problem, smart cards (also called chip cards or IC cards) were developed, which have the ability to store a user's account data on an integrated circuit. EMV, which stands for Europay, MasterCard, and Visa, was developed as a technical standard for smart cards and for payment terminals and automated teller machines that can accept them. EMV cards store their data on integrated circuits as well as on magnetic stripes for backward compatibility. These cards can be physically inserted into a card reader or can be read over short distances using radio-frequency identification (RFID) technology. Payment cards that comply with the EMV standard are often called Chip and PIN or Chip and Signature cards, depending on the authentication methods employed by the card issuer.

Most plastic credit cards and debit cards issued by banks and credit card companies are boring and unimpressive to look at for the average consumer. These institutions sometimes offer cards with various sports team designs or "cute" animal designs that may liven up the plastic card's look and appeal however, the standard bank or credit card company logo is usually included on the card issued to the owner. As such, there is nothing that distinguishes an affluent, sophisticated card holder from an average card holder. Therefore, there remains a need in the art for new types of credit cards and debit cards that are more appealing to the average consumer.

SUMMARY OF THE INVENTION

The invention provides new methods for removing an EMV chip from a plastic credit card or debit card and placing the removed EMV chip onto a metal card, by heating the plastic credit or debit card containing the EMV chip to loosen the EMV chip, the EMV chip being substantially square and planar, the EMV chip having an upward top face, a downward bottom face, and four sides; removing the loosened EMV chip from the plastic credit or debit card; bending the four sides of the EMV chip towards the downward bottom face of the EMV chip; applying an adhesive coating to the bottom face and the bended four sides of the EMV chip; and placing the adhesive coated bottom face and bended four sides of the EMV chip into a holding cavity of the metal card.

DETAILED DESCRIPTION

Figure 1:
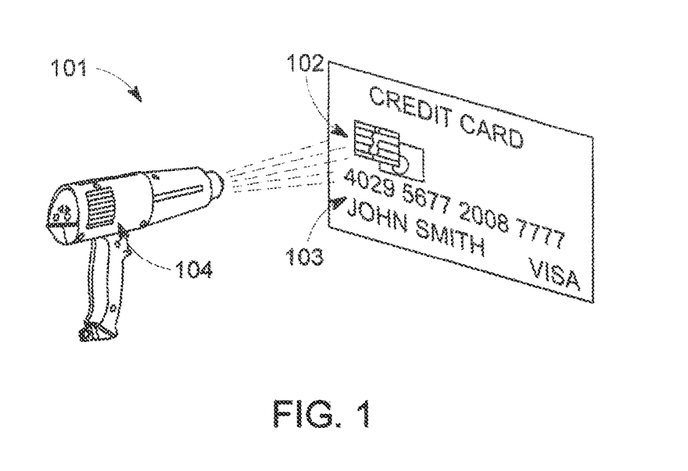
FIG. 1 illustrates an embodiment for removing an EMV chip from a plastic credit card or debit card and placing the removed EMV chip onto a metal card by first heating the plastic credit or debit card containing the EMV chip in order to loosen the EMV chip.

FIG. 1 illustrates an embodiment 101 for removing an EMV chip 102 from a plastic credit card or debit card 103 and placing the removed EMV chip onto a metal card. In order to loosen the EMV chip, the plastic credit or debit card containing the EMV chip is first heated. In an embodiment, heating the plastic credit or debit card includes heating a front face and/or a back face of the card with a heat source such as a heat gun 104, and the like. In an embodiment, the heat source can be set between 350° F. to 400° F. and applied to the front and/or back face of the card for 5 seconds to about 60 seconds. In other embodiments, the heat source can be set at about 370° F. and applied to the front and/or back face of the card for about 10 seconds to 30 seconds. In an embodiment, the EMV chip can be substantially square and planar, the EMV chip having an upward top face, a downward bottom face, and four sides.

In embodiments, the metal card can be made of stainless steel or any other suitable metal or alloy. Further, the metal card can be of any desired colored including but not limited to black, gold (rose, white or yellow gold), titanium, and the like or any combinations thereof. In addition, the metal card can include imprinted information including but not limited to the user's name, account information, and any desired ornamental design.

Figure 2:
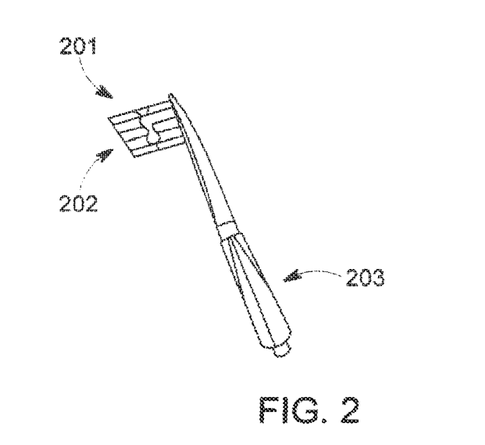
FIG. 2 illustrates an embodiment for removing an EMV chip from a plastic credit card or debit card and placing the removed EMV chip onto a metal card by removing the loosened EMV chip from the plastic credit or debit card.

FIG. 2 illustrates an embodiment 201 for removing an EMV chip from a plastic credit card or debit card 202 and placing the removed EMV chip onto a metal card by removing the loosened EMV chip from the plastic credit or debit card. In an embodiment, a pick and/or tweezers or other similar instruments 203, can be used to loosen or pry off the EMV chip from the plastic credit or debit card.

Figure 3:
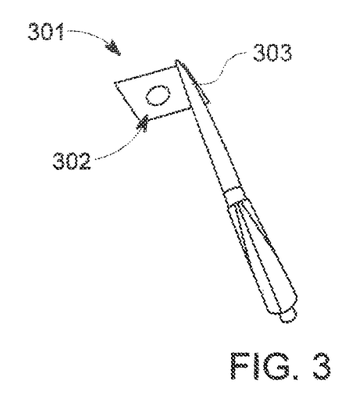
FIG. 3 illustrates an embodiment for removing an EMV chip from a plastic credit card or debit card and placing the removed EMV chip onto a steel metal card by bending the four sides of the removed EMV chip towards the downward bottom face of the EMV chip.

FIG. 3 illustrates an embodiment 301 for removing an EMV chip 302 from a plastic credit card or debit card and placing the removed EMV chip onto a metal card by bending the four sides of the removed EMV chip towards the downward bottom face of the EMV chip by tweezers or other similar instruments 303. In an embodiment, the four sides of the EMV chip can be bent towards the downward bottom face of the EMV chip. In another embodiment, the four sides can be bent towards the downward face of the EMV chip, wherein each of the bended four sides are substantially perpendicular to the downward bottom face.

Figure 4:
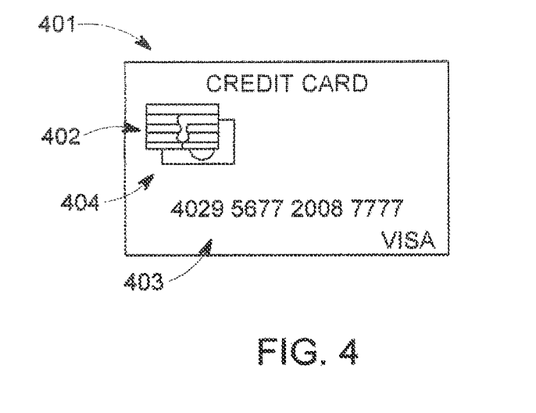
FIG. 4 illustrates an embodiment for removing an EMV chip from a plastic credit card or debit card and placing the removed EMV chip onto a metal card by applying an adhesive coating to the bottom face and the bended four sides of the EMV chip.

FIG. 4 illustrates an embodiment 401 for removing an EMV chip 402 from a plastic credit card or debit card 403 and placing the removed EMV chip onto a metal card by applying an adhesive coating to the bottom face and the bended four sides of the EMV chip. In an embodiment, the adhesive coating can be a cyanoacrylate adhesive coating, for example, ethyl-2-cyanoacrylate. In other embodiments, the adhesive can be one more an epoxy adhesives.

FIGS. 1-4 illustrate various embodiments for removing an EMV chip from a plastic credit card or debit card and placing the removed EMV chip onto a metal card by placing the adhesive coated bottom face and bended four sides of the EMV chip into a holding cavity 404 of the metal card. In an embodiment, the holding cavity in the metal card has sufficient length, width, and depth to hold the EMV chip. In an embodiment, suitable pressure can be applied on the EMV chip in the holding cavity of the metal card for about 10 to about 30 seconds to cure the adhesive. In other embodiments, the EMV chip in the holding cavity of the metal card and the metal card itself can be cleaned with a solution of isopropanol and water to remove any excess adhesive.

The various embodiments described herein for removing an EMV chip from aplastic credit card or debit card and placing the removed EMV chip onto a metal card, can be extended to providing a metal card with more than one EMV chip. For example, the technology allows for the production of a metal card having two EMV chips, in which the two EMV chips may be on the same side of the card, or on opposite sides; a metal credit card having three EMV chips, in which two EMV chips may be on the same side of the card, and the third EMV chip on the opposite side; and a metal credit card having four EMV chips, in which two EMV chips may be on the same side of the card, and the other two EMV chips on the opposite side.

Figure 5:
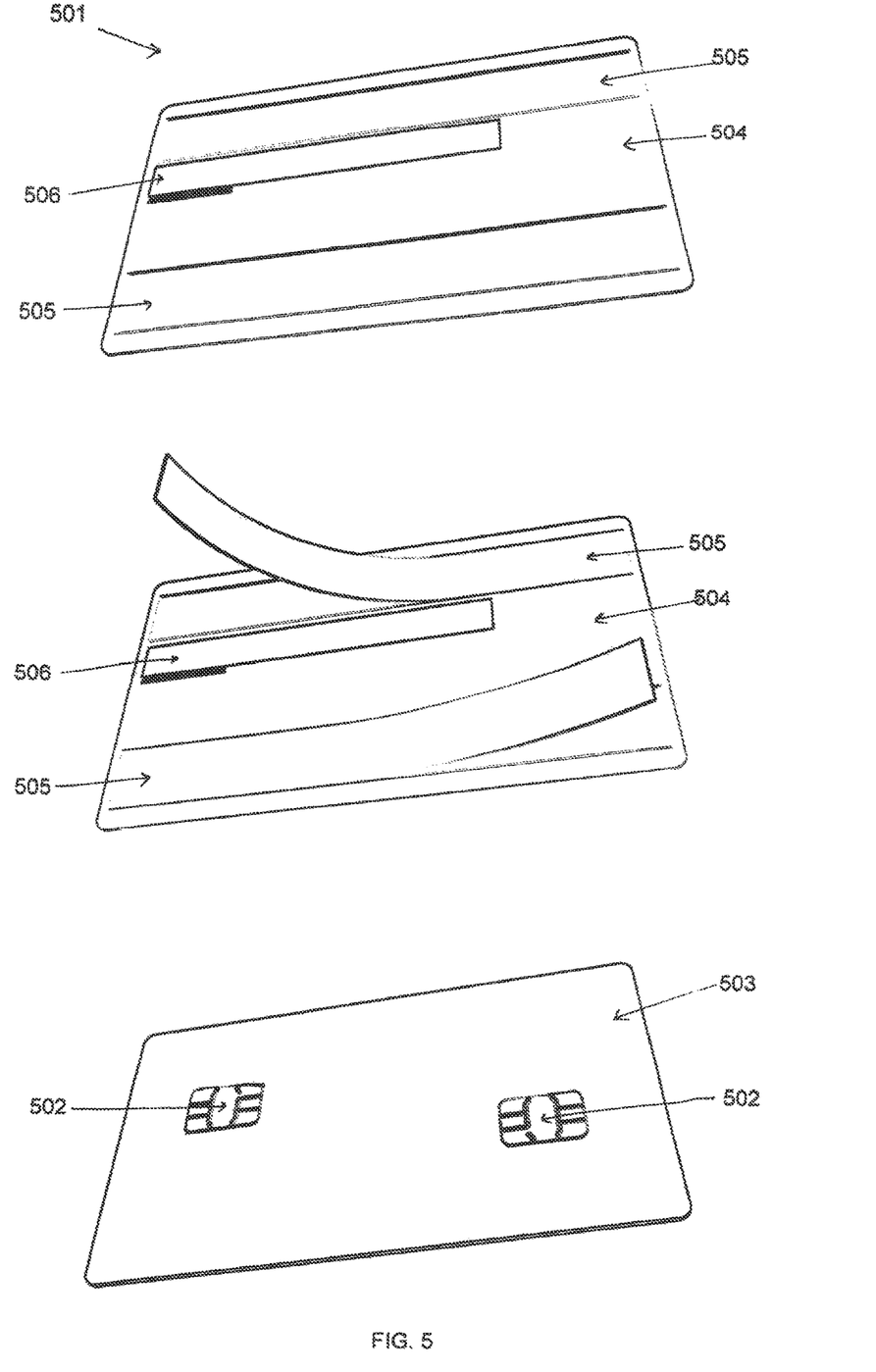
FIG. 5 illustrates an embodiment of two EMV chips taken from a plastic credit card or debit card. which have been placed into a top face of a metal card.

For example, FIG. 5 illustrates an embodiment 501 of two EMV chips 502 taken from a plastic credit card or debit card, which have been placed into a top face of a metal card 503. Also shown is the back of the metal card 504 optionally including magnetic strips 505 and a signature space 506.

Figure 6:
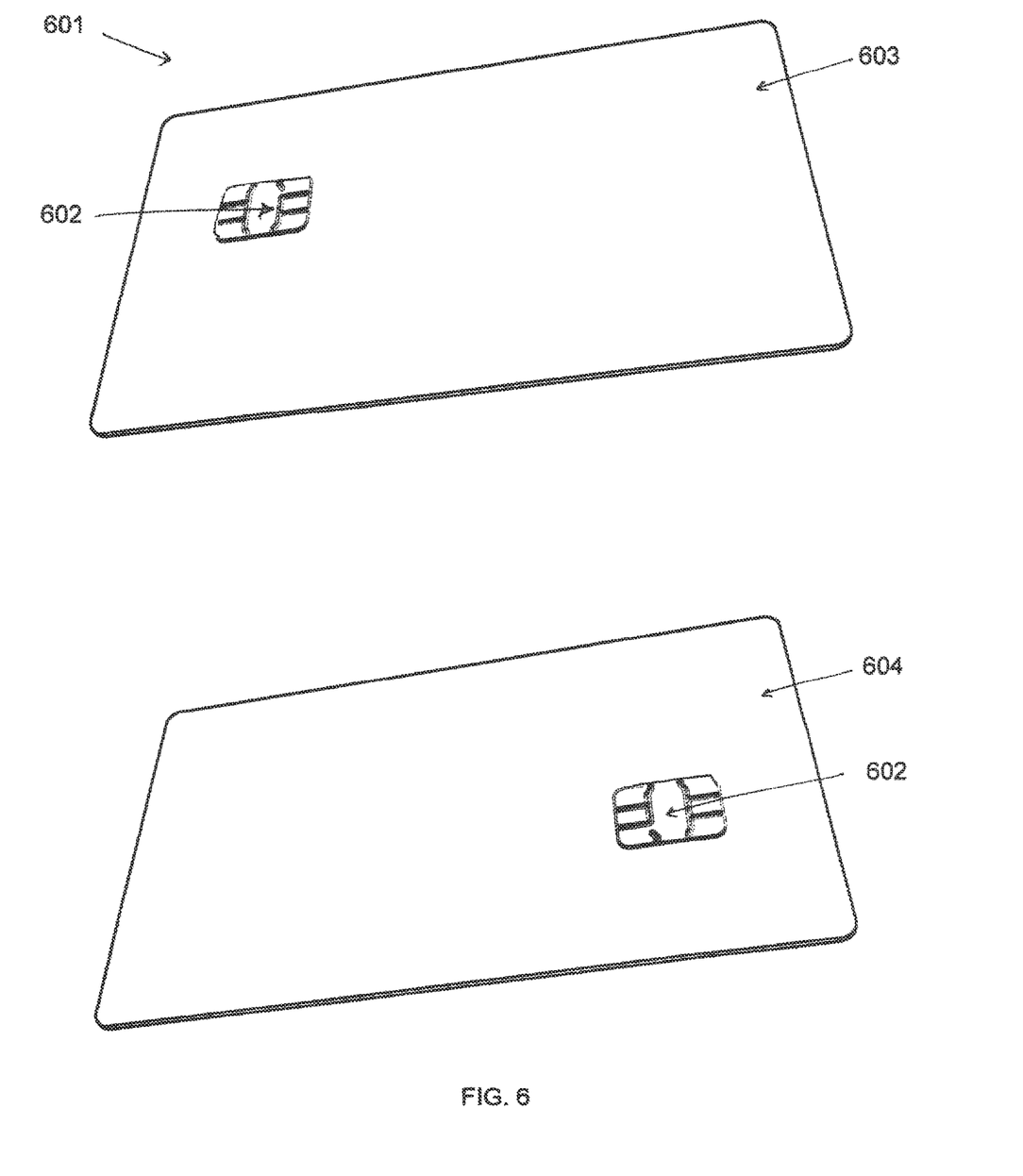
FIG. 6 illustrates an embodiment of two EMV chips taken from a plastic credit card or debit card in which one EMV chip has been placed into a top face of a metal card and the other EMV chip has been placed into the bottom face of a metal credit card.

In another example, FIG. 6 illustrates an embodiment 601 of two EMV chips 602 taken from a plastic credit card or debit card, in which one EMV chip 602 has been placed into a top face of a metal card 603 and the other EMV chip 602 has been placed into the bottom face of a metal credit card 604.

Figure 7:
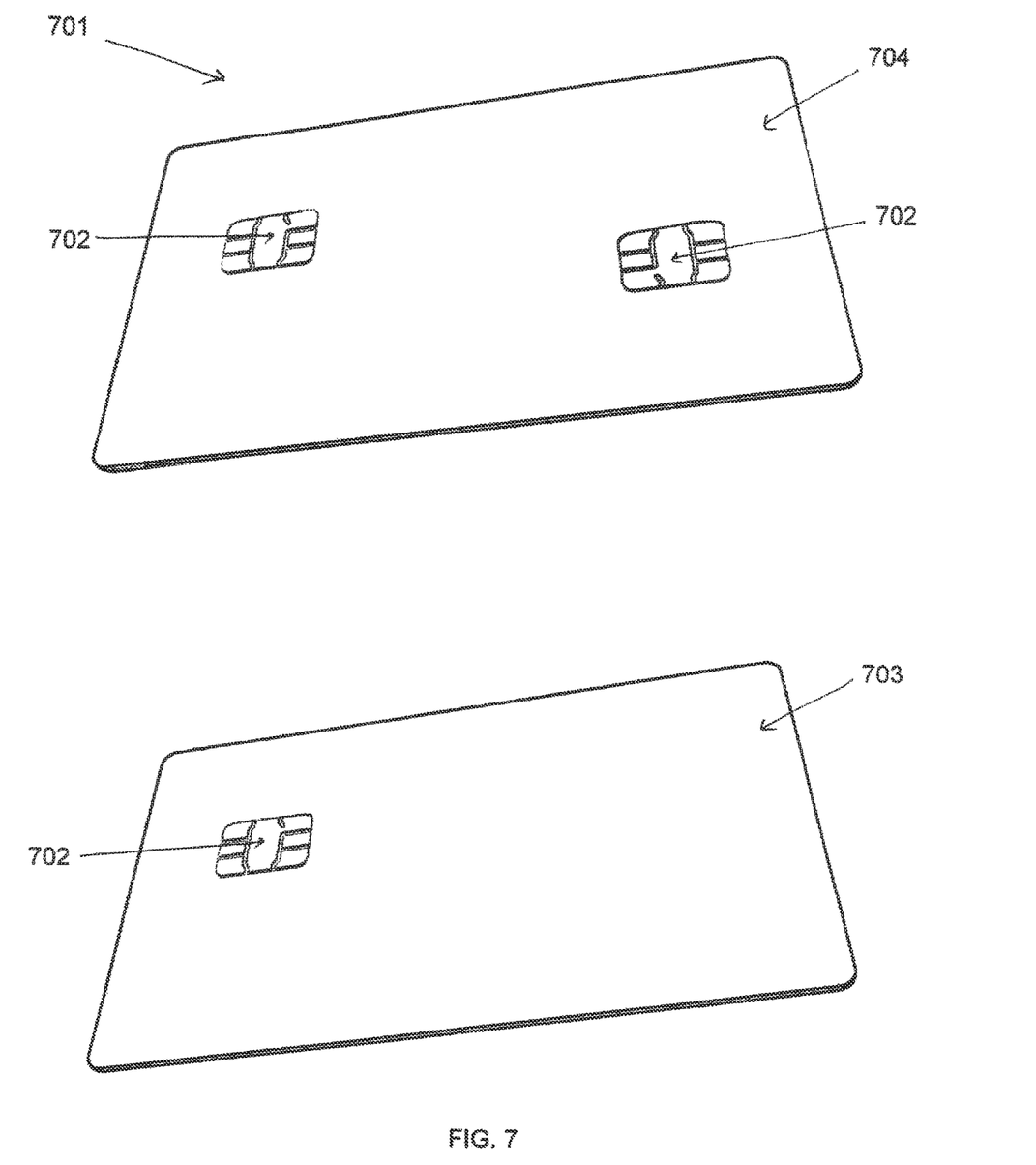
FIG. 7 illustrates an embodiment of three EMV chips taken from a plastic credit card or debit card, in which one EMV chip has been placed into a top face of a metal card and the other two EMV chip have been placed into the bottom face of a metal credit card.

In another example, FIG. 7 illustrates an embodiment 701 of three EMV chips 702 taken from a plastic credit card or debit card, in which one EMV chip 702 has been placed into a top face of a metal card 703 and the other two EMV chips 702 have been placed into the bottom face of a metal credit card 704. Alternatively, two EMV chips can be placed into a top face of a metal card and the other EMV chip can be placed into the bottom face of a metal credit card.

Figure 8:
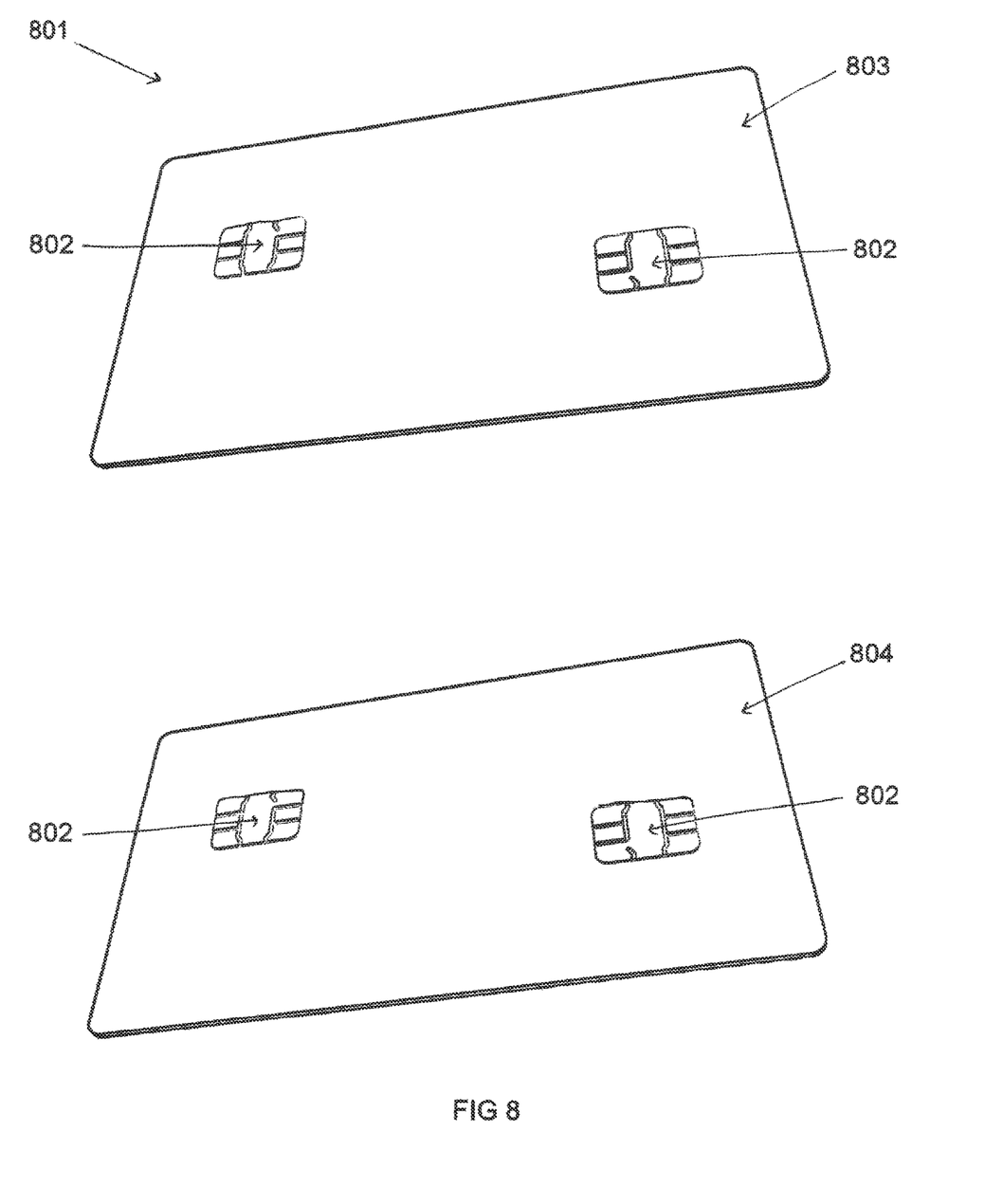
FIG. 8 illustrates an embodiment of four EMV chips taken from a plastic credit card or debit card; in which two EMV chips have been placed into a top face of a metal card and the other two EMV chips have been placed into the bottom face of a metal credit card.

In another example, FIG. 8 illustrates an embodiment 801 of four EMV chips 802 taken from a plastic credit card or debit card, in which two EMV chips 802 have been placed into a top face of a metal card 803 and the other two EMV chips have been placed into the bottom face of a metal credit card 804.

Thus, in another embodiment the disclosure provides methods for removing one or more EMV chips from one or more plastic credit cards or one or more debit cards and placing the removed one or more EMV chips onto a metal card, which includes heating the one or more plastic credit cards or the one or more debit cards containing the one or more EMV chips to loosen the one or more EMV chips, each of the one or more EMV chips being substantially square and planar, each of the one or more EMV chips having an upward top face, a downward bottom face, and four sides; removing each of the loosened one or more EMV chips from the one or more plastic credit cards or the one or more debit cards; bending the four sides of each of the one or more EMV chips towards the downward bottom face of each of the one or more EMV chips; applying an adhesive coating to the bottom face and the bended four sides of each of the one or more EMV chips; and placing the adhesive coated bottom face and bended four sides of each of the one or more EMV chips into a separate holding cavity of the metal card.

In other embodiments, the disclosure provides methods for removing one or more EMV chips from one or more plastic credit cards or one or more debit cards and placing the removed one or more EMV chips onto a metal card, which further include heating a front face, and a back face of the one or more plastic credit cards or the one or more debit cards containing the one or more EMV chips with a heat gun to loosen each of the one or more EMV chips.

In another embodiment, the disclosure provides methods for removing one or more EMV chips from one or more plastic credit cards or one or more debit cards and placing the removed one or more EMV chips onto a metal card, which further includes heating the front face and the back face of the one or more plastic credit cards or the one or more debit cards containing the one or more EMV chips with a heat gun from between about 350° F. to about 400° F.

In other embodiments, the disclosure provides methods for removing one or more EMV chips from one or more plastic credit cards or one or more debit cards and placing the removed one or more EMV chips onto a metal card, which further includes heating the front face and the back face of the one or more plastic credit cards or the one or more debit cards containing the one or more EMV chips with a heat gun at about 370° F. for about 10 seconds to about 30 seconds.

In other embodiments, the disclosure provides methods for removing one or more EMV chips from one or more plastic credit cards or one or more debit cards and placing the removed one or more EMV chips onto a metal card, which further includes removing the loosened one or more EMV chips from the one or more plastic credit cards or the one or more debit cards using a pick.

In other embodiments, the disclosure provides methods for removing one or more EMV chips from one or more plastic credit cards or one or more debit cards and placing the removed one or more EMV chips onto a metal card, which further includes bending the four sides of each of the one or more EMV chips towards the downward bottom face of each of the one or more EMV chips, each of the bended four sides being substantially perpendicular to the downward bottom face.

In other embodiments, the disclosure provides methods for removing one or more EMV chips from one or more plastic credit cards or one or more debit cards and placing the removed one or more EMV chips onto a metal card, which further includes applying a cyanoacrylate adhesive coating to the bottom face and the bended four sides of each of the one or more EMV chips in each of the separate holding cavities of the metal card.

In other embodiments, the disclosure provides methods for removing one or more EMV chips from one or more plastic credit cards or one or more debit cards and placing the removed one or more EMV chips onto a metal card, wherein the cyanoacrylate adhesive coating comprises ethyl-2-cyanoacrylate.

In other embodiments, the disclosure provides methods for removing one or more EMV chips from one or more plastic credit cards or one or more debit cards and placing the removed one or more EMV chips onto a metal card, which further includes applying pressure on each of the one or more EMV chips in the separate holding cavity of the metal card for about 10 to about 30 seconds to cure the adhesive.

In other embodiments, the disclosure provides methods for removing one or more EMV chips from one or more plastic credit cards or one or more debit cards and placing the removed one or more EMV chips onto a metal card, which further includes cleaning each of the one or more EMV chips in the separate holding cavities of the metal card and the metal card with a solution of isopropanol and water to remove any excess adhesive.

In other embodiments, the disclosure provides methods for removing one or more EMV chips from one or more plastic credit cards or one or more debit cards and placing the removed one or more EMV chips onto a metal card, wherein the metal card is a stainless-steel metal card.

In another embodiment, the disclosure provides a metal credit card or a metal debit card, which includes two or more EMV chips arranged on a top face or a bottom face of the metal credit card or the metal debit card.

In other embodiments, the disclosure provides a metal credit card or a metal debit card, wherein one of the two or more EMV chips is arranged on the top face of the metal credit card or metal debit card, and another of the two or more EMV chips are arranged on the bottom face of the metal credit card or metal debit card.

In other embodiments, the disclosure provides a metal credit card or a metal debit card, wherein one of the two or more EMV chips is arranged on the top face of the metal credit card or metal debit card, and two of the two or more EMV chips are arranged on the bottom face of the metal credit card or metal debit card.

In other embodiments, the disclosure provides a metal credit card or a metal debit card wherein one of the two or more EMV chips is arranged on the bottom face of the metal credit card or metal debit card, and two of the two or more EMV chips are arranged on the top face of the metal credit card or metal debit card.

In other embodiments, the disclosure provides a metal credit card or a metal debit card, wherein two of the two or more EMV chips are arranged on the top face of the metal credit card or metal debit card, and two of the two or more EMV chips are arranged on the bottom face of the metal credit card or metal debit card.

In other embodiments, the disclosure provides a metal credit card or a metal debit card, wherein the metal card and the metal debit card is a stainless-steel metal credit card or a stainless-steel metal debit card.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of removing one or more EMV chips from one or more cards and placing the removed one or more EMV chips onto a metal card, comprising:
   loosening the one EMV chips of the one or more cards, each of the one or more EMV chips having an upward top face, a downward bottom face, and a plurality of sides;
   removing each of the loosened one or more EMV chips from the one or more cards;
   applying an adhesive between the bottom face of each of the removed one or more EMV chips and one or more separate locations of the metal card; and
   placing the bottom face of each of the removed one or more EMV chips onto the one or more separate locations of the metal card.

2. The method according to claim 1, further comprising heating a front face or a back face of the one or more cards containing the one or more EMV chips.

3. The method according to claim 2, further comprising heating the front face and the back face of the one or more cards containing the one or more EMV chips with a heat gun from between about 350° F. to about 400° F.

4. The method according to claim 1, wherein each separate location is on a front face of the metal card; or wherein each separate location is on a rear face of the metal card; or wherein at least one location of each separate location is on the front face of the metal card and at least another location of each separate location is on the rear face of the metal card.

5. The method according to claim 1, further comprising removing the loosened one or more EMV chips from the one or more cards using a pick.

6. The method according to claim 1, wherein each of the one or more EMV chips has four sides.

7. The method according to claim 1, further comprising bending the sides of each of the removed one or more EMV chips towards the downward bottom face of each of the one or more EMV chips.

8. The method according to claim 7, wherein each of the bended sides being substantially perpendicular to the downward bottom face.

9. The method according to claim 7, further comprising applying the adhesive to the bended sides of each of the one or more EMV chips.

10. The method according to claim 1, further comprising applying a cyanoacrylate adhesive coating to the bottom face of each of the one or more EMV chips.

11. The method according to claim 10, wherein the cyanoacrylate adhesive coating comprises ethyl-2-cyanoacrylate.

12. The method according to claim 1, wherein each of the one or more separate locations comprises a holding cavity to receive one of the removed one or more EMV chips.

13. The method according to claim 1, further comprising applying pressure on each of the one or more EMV chips on the metal card for about 10 to about 30 seconds to cure the adhesive.

14. The method according to claim 1, further comprising cleaning each of the one or more EMV chips and the metal card with a solution of isopropanol and water to remove any excess adhesive.

15. The method according to claim 1, wherein the one of more cards comprise one or more plastic credit cards or one or more debit cards.

16. The method according to claim 1, wherein the metal card is a stainless-steel metal card.

17. An electronic payment card comprising:
a metal card substrate having opposed top and bottom faces;
a cavity in the metal card substrate recessed to a depth below one of the top and bottom faces; and
an EMV chip disposed in the cavity, wherein the EMV chip is a donor EMV chip loosened and removed from a donor electronic payment card on which the donor EMV chip was previously disposed.

18. An electronic payment card comprising:
a metal card substrate having opposed top and bottom faces;
a cavity in the metal card substrate recessed to a depth below one of the top and bottom faces;
an EMV chip disposed in the cavity, wherein the EMV chip is a donor EMV chip from a donor electronic payment card on which the donor EMV chip was previously disposed; and
the donor EMV chip having been loosened from the donor electronic payment card, then removed from the donor electronic payment card, and then adhered to the metal card substrate.

* * * * *